(12) United States Patent
Hayashi

(10) Patent No.: US 9,371,930 B2
(45) Date of Patent: Jun. 21, 2016

(54) FLUID CONTROL VALVE

(75) Inventor: Shigeyuki Hayashi, Kyoto (JP)

(73) Assignee: HORIBA STEC, Co., Ltd., Kyoto-shi (JP)

( * ) Notice: Subject to any disclaimer, the term of this patent is extended or adjusted under 35 U.S.C. 154(b) by 650 days.

(21) Appl. No.: 13/598,409

(22) Filed: Aug. 29, 2012

(65) Prior Publication Data

US 2013/0048898 A1 Feb. 28, 2013

(30) Foreign Application Priority Data

Aug. 30, 2011 (JP) .................. 2011-188017

(51) Int. Cl.
F16K 1/50 (2006.01)
F16K 31/00 (2006.01)
F16K 47/00 (2006.01)
F16K 1/44 (2006.01)

(52) U.S. Cl.
CPC .................. F16K 31/007 (2013.01); F16K 1/44 (2013.01); F16K 47/00 (2013.01); F16K 1/50 (2013.01)

(58) Field of Classification Search
CPC ......... F16K 1/44; F16K 31/007; F16K 47/00; F16K 1/50
USPC ........................................................ 251/337
See application file for complete search history.

(56) References Cited

U.S. PATENT DOCUMENTS

| 2,298,253 | A | * | 10/1942 | Dillman et al. ................ 251/337 |
| 2,630,139 | A | * | 3/1953 | Nagel ....................... 251/129.02 |
| 2,682,387 | A | * | 6/1954 | Gaddoni ........................ 251/337 |
| 3,302,662 | A | * | 2/1967 | Webb .............................. 137/539 |
| 4,726,395 | A | * | 2/1988 | Howes et al. .................. 137/469 |
| 4,821,954 | A | * | 4/1989 | Bowder ........................ 236/48 R |
| 4,848,726 | A | * | 7/1989 | Hary ....................... 251/129.02 |
| 5,251,871 | A | | 10/1993 | Suzuki |
| 5,582,208 | A | | 12/1996 | Suzuki |
| 6,401,749 | B1 | * | 6/2002 | Tai et al. ........................ 137/540 |
| 6,443,183 | B1 | * | 9/2002 | Roorda .......................... 137/529 |
| 6,708,712 | B2 | * | 3/2004 | Wakeman .................. 137/15.19 |

(Continued)

FOREIGN PATENT DOCUMENTS

CN 101089383 A 12/2007
JP S61016460 U 1/1986

(Continued)

OTHER PUBLICATIONS

Japanese Patent Office, Office Action Issued in Japanese Patent Application No. 2011-188017, Mar. 24, 2015, 5 pages.

(Continued)

*Primary Examiner* — William McCalister
(74) *Attorney, Agent, or Firm* — Alleman Hall McCoy Russell & Tuttle LLP

(57) ABSTRACT

An object of this invention is both to prevent contamination of a fluid passing a fluid control valve and to prevent a tilt of a valve body in a moving direction and vibration of the valve body. The fluid control valve comprises a valve body that is arranged on an inner surface of a valve chest through a predetermined space in the valve chest and that is arranged on a valve seat arranged in the valve chest in a detachable manner, an actuator that biases the valve body in a direction of opening the valve, a valve body return spring that biases the valve body in a direction of closing the valve, and a tilt restraining spring that biases the valve body in a direction of resolving a tilt of the valve body to an open/close direction.

9 Claims, 6 Drawing Sheets

(56) References Cited

U.S. PATENT DOCUMENTS

| | | | |
|---|---|---|---|
| D528,407 S * | 9/2006 | Schwab | D8/399 |
| 7,287,546 B2 * | 10/2007 | Konishi | 137/540 |
| 8,083,209 B2 * | 12/2011 | Kozdras et al. | 251/337 |
| 8,096,319 B2 * | 1/2012 | Beck | 137/543.19 |
| 2007/0007485 A1 * | 1/2007 | Muhr et al. | 251/337 |
| 2011/0203888 A1 * | 8/2011 | Sonsterod | F16F 9/464 188/322.13 |

FOREIGN PATENT DOCUMENTS

| | | |
|---|---|---|
| JP | 2002005329 A | 1/2002 |
| JP | 2002019630 A | 1/2002 |
| JP | 2003254201 A | 9/2003 |
| JP | 2005195145 A | 7/2005 |
| JP | 2007298179 A | 11/2007 |
| JP | 2010230159 | 10/2010 |
| WO | 0184029 A1 | 11/2001 |

OTHER PUBLICATIONS

State Intellectual Property Office of the People's Republic of China, First Office Action Issued in Chinese Patent Application No. 201210310859.3, Sep. 18, 2015, 11 pages.

Japanese Patent Office, Decision of Refusal Issued in Japanese Patent Application No. 2011-188017, Nov. 10, 2015, 4 pages.

* cited by examiner

FLUID CONTROL VALVE

FIELD OF THE ART

This invention relates to a fluid control valve used for a mass flow controller or the like that controls a flow rate of, for example, a gas.

BACKGROUND ART

A fluid control valve is arranged between an upstream side flow channel and a downstream side flow channel and controls a flow rate of a fluid flowing between the upstream side flow channel and the downstream side flow channel or opens/closes the flow channel. For example, a fluid control valve having an arrangement as shown in Patent Document 1 is known as a fluid control valve that controls the flow rate of the gas used for semiconductor process.

For example, the fluid control valve of a normal close type is, as shown in FIG. 7 of the Patent Document 1, arranged in a valve chest formed on a body, and has a valve body arranged in a detachable manner on a valve seat arranged in the valve chest, an actuator that biases the valve body in a direction of opening the valve, and a valve body return spring that biases the valve body in a direction of closing the valve.

Then, in order to prevent contamination of the fluid, the fluid control valve forms a space between the valve body and a surrounding surface that surrounds a side surface of the valve body so that not only is lubricant not required but the valve body and the surrounding surface are also not free from abrasion.

PRIOR ART DOCUMENT

Patent Document

Patent document 1: Japanese Unexamined Patent Application Publication No. 2010-230159

DISCLOSURE OF THE INVENTION

Problems to be Solved by the Invention

However, since there is the space between the valve body and the surrounding surface, the valve body tilts to a direction of opening/closing the valve and the valve body vibrates while opening/closing the valve due to an influence of the pressure from the fluid. As a result of this, there is a problem that an error in the valve open degree adjusted by the actuator might generate. In addition, there are other problems that a vibration sound generates because the valve body makes contact with its peripheral members and the valve body or the peripheral members are worn away or broken due to a vibrating movement of the valve body.

Thus, the present claimed invention intends to solve all of the above problems, and a main object of this invention is to prevent contamination of the fluid passing the fluid control valve, a tilt of the valve body to the moving direction, and vibration of the valve body.

Means to Solve the Problems

More specifically, a fluid control valve in accordance with this invention is a fluid control valve that is configured to control a fluid from an upstream side flow channel and is configured to flow out the fluid to a downstream side flow channel, and is characterized by comprising a valve body that is arranged on an inner surface of a valve chest through a predetermined space in the valve chest and that is arranged on a valve seat arranged in the valve chest in a detachable manner, an actuator that is configured to bias the valve body in a direction of opening the valve, a valve body return spring that is configured to bias the valve body in a direction of closing the valve, and a tilt restraining spring that is configured to bias the valve body in a direction of resolving a tilt of the valve body to an open/close direction.

In addition, a fluid control valve in accordance with this invention is a fluid control valve that is configured to control a fluid from an upstream side flow channel and is configured to flow out the fluid to a downstream side flow channel, and is characterized by comprising a valve body that is arranged on an inner surface of a valve chest through a predetermined space in the valve chest and that is arranged on a valve seat arranged in the valve chest in a detachable manner, an actuator that biases the valve body in a direction of closing the valve, a valve body return spring that biases the valve body in a direction of opening the valve, and a tilt restraining spring that biases the valve body in a direction of resolving a tilt of the valve body to an open/close direction.

In accordance with this arrangement, since the valve body is biased by the tilt restraining spring to a direction of resolving a tilt of the valve body to the direction of opening/closing the valve, it is possible to restrain a tilt of the valve body. As a result of this, it is possible to prevent vibration generated by the tilt of the valve body generated by an influence of the pressure received from the fluid or repetitive tilting movements to an opposite side due to swinging back movements of the tilt of the valve body. In accordance with this arrangement, it is possible to keep a posture of the valve body constant so that an error in the valve open degree adjusted by the actuator can be reduced while opening/closing the valve. In addition, since vibration of the valve body can be prevented, it is possible to prevent abnormal noises generated by making contact of the valve body with the peripheral members. This also prevents abrasion or breakage of the valve body or the peripheral members. Furthermore, since the valve body return spring and the tilt restraining spring are separately arranged, it is possible to design a spring constant of the valve body return spring and a spring constant of the tilt restraining spring respectively so as to produce an intrinsic function of each spring sufficiently. In addition, since the natural frequency can be increased by using the valve body return spring and the tilt restraining spring, it is possible to prevent resonance of the valve body. Furthermore, since the valve body is arranged separately from the inner surface forming the valve chest by the determined space, it is in no danger of contaminating the fluid because of abrasion powders generated by the sliding movement of the valve body and the valve chest or because of lubricant.

As a concrete embodiment of the tilt restraining spring it is preferable that the tilt restraining spring has a ring-shaped body part that is arranged to make contact with a valve body side or one of inner surface sides of the valve chest, and a plurality of projecting parts that extend from the body part and that are arranged to make contact with the valve body side or the other of the inner surface sides of the valve chest. In accordance with this arrangement, since the tilt restraining spring has a plurality of projecting parts, it is possible to make each projecting part easily make an elastic transformation so that the spring constant can be made small. In addition, even though the valve body may tilt to any direction when opening/closing the valve, it is possible for any projecting part to apply the biasing force to the valve body. As a result of this, the tilt of the valve body can be restrained. Furthermore, since the ring-shaped body part and the multiple projecting parts are integrally formed, it is possible not only to reduce a number of components but also to reduce a number of assembling processes.

It is preferable that each of the plurality of projecting parts is of the same shape and formed at even intervals in the circumferential direction. In accordance with this arrangement, it is possible to uniformly apply the biasing force from each projecting part to the valve body in a state wherein the valve body is not tilted relative to the open/close direction. Namely, in a case that the valve body tilts, the projecting part located in a tilt direction of the valve body makes an elastic transformation of a larger degree than that of the other projecting parts so that a larger biasing force is applied to the valve body in a direction of resolving the tilted state of the valve body. As a result of this, the tilted state of the valve body is resolved.

In order to make it easy for the valve body return spring to return the valve body to a state before the valve body is moved by the actuator and to resolve the tilted state of the valve body efficiently by increasing the moment applied to the valve body by means of the tilt restraining spring, it is preferable that the valve body return spring applies a biasing force on a center side near a center axis of the valve body, and the tilt restraining spring applies a biasing force on an outside peripheral side of the center side where the biasing force of the valve body return spring is applied. In order to increase the moment applied to the valve body by the tilt restraining spring as much as possible, it is preferable that the tilt restraining spring applies the biasing force to an outer circumferential part of a part having the maximum outer diameter of the valve body or its vicinity.

Effect of the Invention

In accordance with this invention having the above-mentioned arrangement, it is possible to prevent contamination of the fluid passing the fluid control valve, and not only to adjust the valve open degree of the fluid control valve with high accuracy but also to prevent abnormal noises generated by vibration of the valve body or breakage of the valve body generated by making contact of the valve body with its peripheral members.

DETAILED DESCRIPTION OF THE EMBODIMENTS

One embodiment of a fluid control valve in accordance with this invention will be explained with reference to drawings.

First Embodiment

One embodiment of a mass flow controller 100 into which the fluid control valve in accordance with this invention is incorporated will be explained with reference to the drawings.

Figure 1:
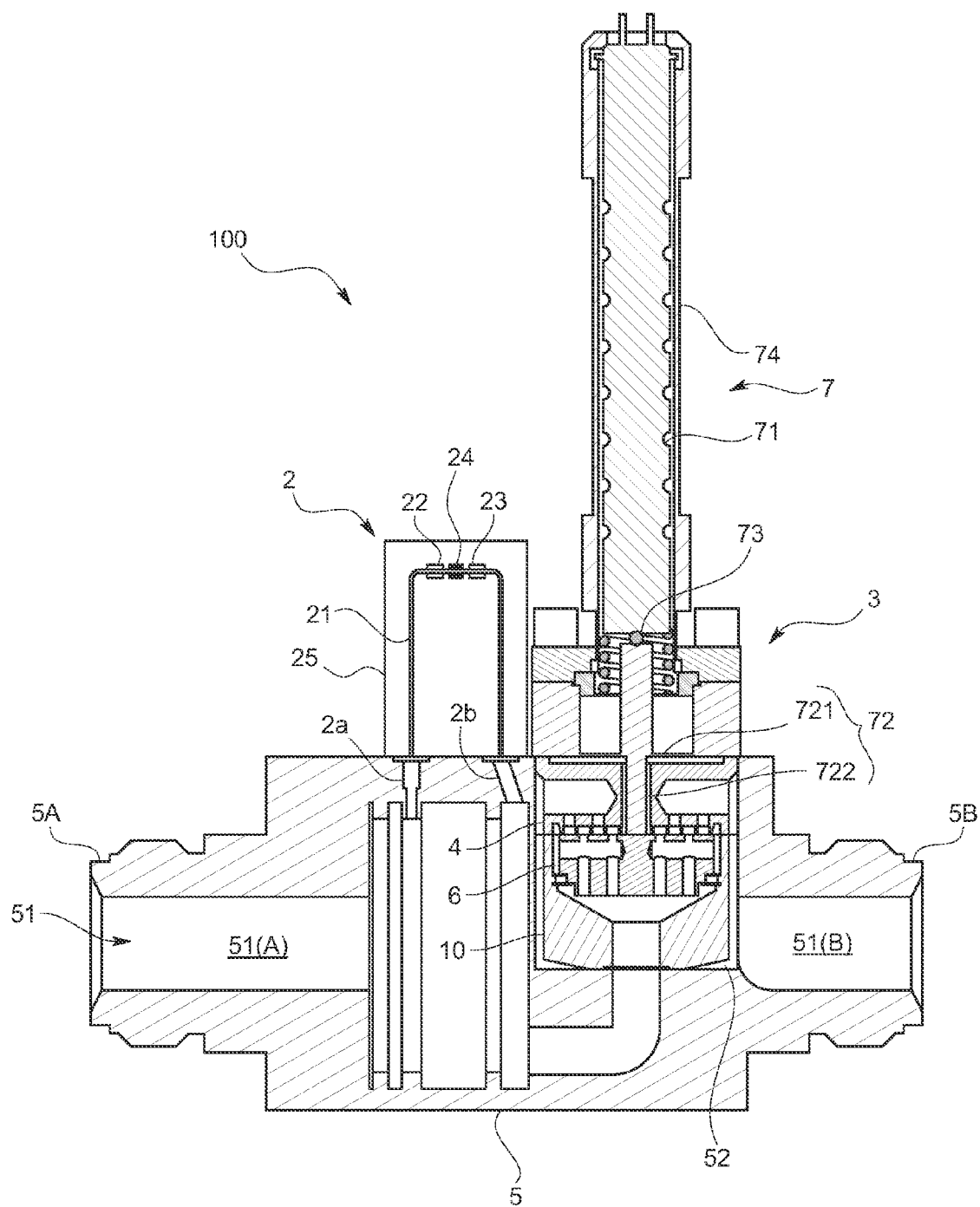
FIG. 1 is an overall cross-sectional view of a mass flow controller in accordance with a first embodiment of this invention.

The mass flow controller 100 of this embodiment is used for a semiconductor manufacturing device, and, as shown in FIG. 1, comprises a body 5 forming a flow channel 51 where a fluid such as a gas used for, for example, a semiconductor manufacturing process, flows as an object to be measured, a flow rate detection mechanism 2 that senses a flow rate of the fluid flowing in the flow channel 51 of the body 5, a fluid control valve 3 that controls the flow rate of the fluid flowing in the flow channel 51 and a control part (not shown in drawings) that controls a valve open degree of the fluid control valve 3 so as to make the measured flow rate output by the flow rate detection mechanism 2 at a value closer to a previously determined set flow rate. Each part will be described in detail below.

The body 5 is in a block shape where the flow channel 51 penetrates, and an upstream end of the flow channel 51 is connected to an external inflow pipe (not shown in drawings) as an upstream side port 5A, and a downstream end thereof is connected to an external outflow pipe (not shown in drawings) as a downstream side port 5B.

Various types of flow rate detection mechanism such as a thermal type, a Coriolis type or an ultrasonic type are conceived as the flow rate detection mechanism 2, and a so called thermal type flow rate detection mechanism is used in this embodiment. The thermal type flow rate detection mechanism 2 comprises a narrow tube 21 connected in parallel to the flow channel 51 so as to introduce a predetermined ratio of the fluid from the fluid flowing in the flow channel 51, a heater 24 arranged in the narrow tube 21 and a pair of temperature sensors 22, 23 arranged in the downstream side and the upstream side of the heater 24. At a time when the fluid flows in the narrow tube 21, since a temperature difference corresponding to the mass flow rate generated between the two temperature sensors 22, 23, the flow rate is measured based on the temperature difference.

In this embodiment are provided a lengthy case 25 that houses the narrow tube 21, the heater 24, the temperature sensors 22, 23 and its peripheral electric circuits, and a pair of bifurcated flow channels 2a, 2b that bifurcate from the flow channel 51 of the body 5. In a state where the case 25 is mounted on the body 5, an introducing port of the narrow tube 21 is connected to the bifurcated flow channel 2a locating in the upstream side and a lead out port of the narrow tube 21 is connected to the bifurcated flow channel 2b locating in the downstream side. The flow rate sensor is not limited to this type.

The fluid control valve 3 is of a normal close type arranged on the flow channel 51, and comprises a valve seat member 4 and a valve body member 6 as being a pair of valve members housed in the body 5, and an actuator 7 that sets a valve open degree, namely, a separated distance between the valve seat member 4 and the valve body member 6 by driving the valve body member 6.

Figure 2:
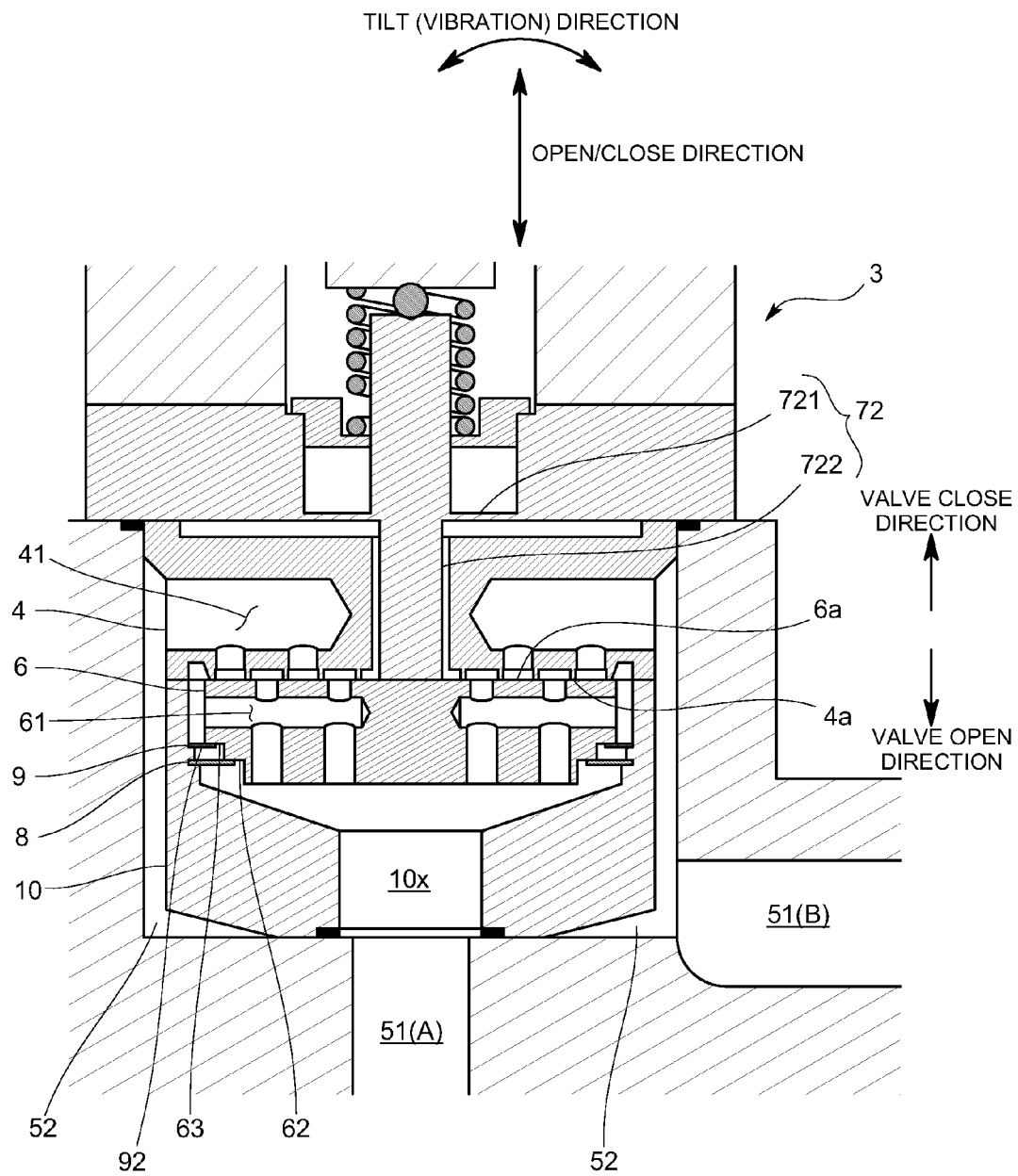
FIG. 2 is a cross-sectional view of a fluid control valve in accordance with this embodiment.

The valve seat member 4 serves as a valve seat, and is in a shape of a two-step cylinder, a diameter of a lower surface side of which is smaller than that of an upper surface side thereof as shown in FIG. 2, and whose lower surface serves as the valve seat surface 4a. Inside of the valve seat member 4 formed are a plurality of internal flow channels 41, wherein one end of each internal flow channel 41 opens on the valve seat surface 4a and the other end of each internal flow channel 41 opens on a side peripheral surface. Openings of the multiple internal flow channels 41 on the valve seat surface 4a are formed concentrically.

The valve seat member 4 fits into a cylindrical concave part 52 arranged on the body 5. The concave part 52 is arranged to divide the flow channel 51 of the body 5, and the flow channel 51(A) (hereinafter also called as an upstream side flow channel) located in the upstream side among the flow channels 51 divided by the concave part 52 opens on a bottom surface of the concave part 52, and the flow channel 51(B) (hereinafter also called a downstream side flow channel) located in the downstream side opens on a side surface of the concave part 52. The concave part 52 forms a valve chest where the valve seat is valve seat member 4 and the valve body is valve body member 6, to be described later, are arranged.

In a state that the valve seat member 4 fits into the concave part 52, while the large diameter part of the valve seat member 4 fits into the inner peripheral surface of the concave part 52 generally with no space between the large diameter part and the inner peripheral surface, a space is formed between the small diameter part of the valve seat member 4 and the inner peripheral surface of the concave part 52. As a result of this, the downstream side flow channel 51(B) of the body 5 is in communication with the internal flow channel 41 through the side peripheral surface of the concave part 52.

The valve body member 6 serves as the valve body, and is arranged to face the valve seat member 4 in the concave part 52 of the body 5 through a predetermined space from the inner peripheral surface without making contact with the inner peripheral surface of the concave part 52. An upper surface of the valve body member 6 is in general a disk shape and serves as a seating surface 6a. Inside of the valve body member 6 formed are a plurality of internal flow channels 61, wherein one end of each internal flow channel 61 opens on the bottom surface of the valve body member 6 and the other end of each internal flow channel 61 opens on the seating surface 6a. Openings of the multiple internal flow channels 61 on the seating surface 6a are formed concentrically and are not overlapped with the opening of the above-mentioned multiple internal flow channels 41 on the valve seat surface 4a.

The valve body member 6 is biased by receiving a driving force from the actuator (a driving part) 7 and moves from a closed state wherein the upstream side flow channel 51(A) is blocked from the downstream side flow channel 51(B) by making contact with the valve seat member 4 to an open state wherein the upstream side flow channel 51(A) is in communication with the downstream side flow channel 51(B) by being separated from the valve seat member 4. A direction from the closed state to the open state, namely a direction of the driving force of the actuator 7 acting on the valve body member 6 is a direction of opening the valve. Meanwhile, a direction from the open state to the closed state, namely an opposite direction to a direction of the driving force of the actuator 7 acting on the valve body member 6 is a direction of closing the valve.

The actuator 7 comprises, for example, a piezoelectric stack 71 formed by stacking a plurality of piezoelectric elements and an operating member 72 that changes its place due to extension of the piezoelectric stack 71. The piezoelectric stack 71 is housed in a casing member 74, and a distal end part of the piezoelectric stack 71 is connected to the operating member 72 through a middle connecting member 73. The operating member 72 of this embodiment has a diaphragm member 721 and a connection bar 722 that is arranged on a center of the diaphragm member 721 and that penetrates a center of the valve seat member 4 so as to make an abutting contact with the valve body member 6. When a certain voltage is applied to the actuator 7, the piezoelectric stack 71 extends so that the operating member 72 biases the valve body member 6 toward a direction of opening the valve. As a result of this, the valve seat surface 4a is separated from the seating surface 6a so as to be in the open state. In addition, if the voltage applied to the actuator 7 is below a certain voltage, the valve seat surface 4a is separated from the seating surface 6a by a distance according to the voltage amount. Then the upstream side flow channel 51(A) is in communication with the downstream side flow channel 51(B) through the space.

In addition, a valve body return spring 8 that biases the valve body member 6 toward a direction of closing the valve is arranged in a state of being attached to the valve body member 6. In a normal state wherein no voltage is applied to the actuator 7, the valve body member 6 becomes in a closed state due to the valve body return spring 8.

Figure 3:
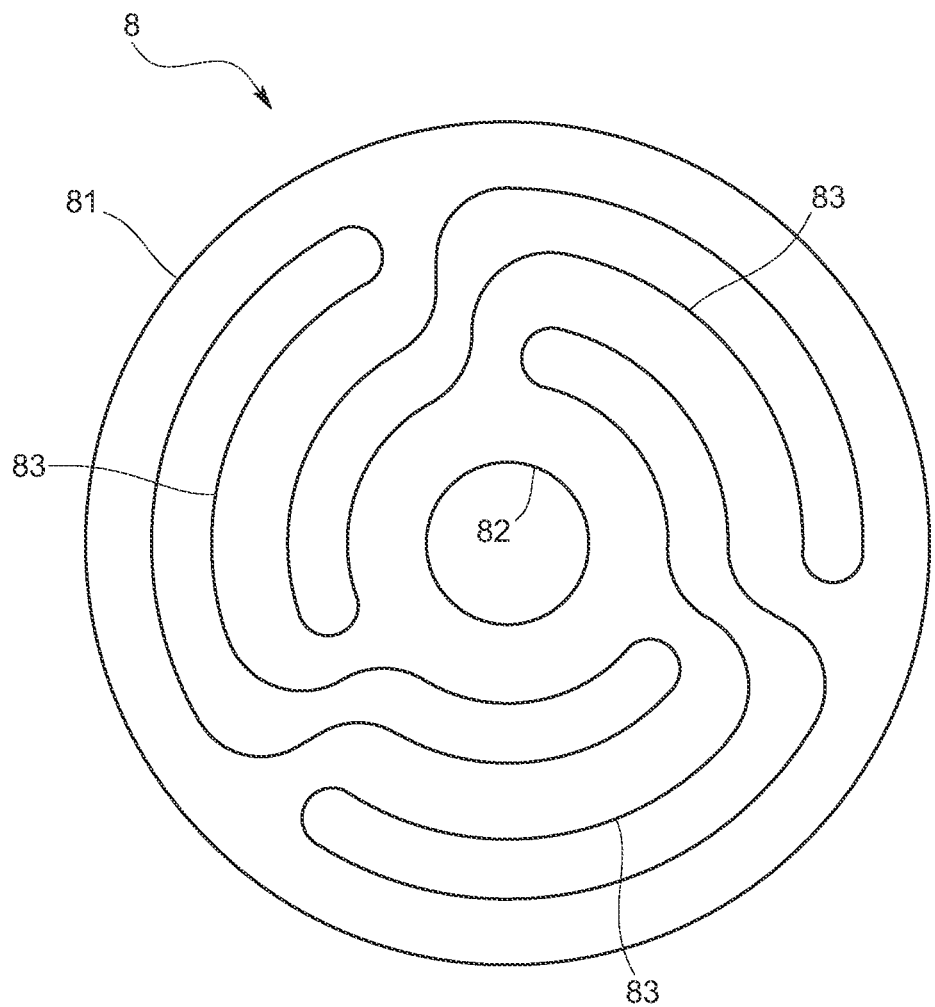
FIG. 3 is a plane view of a valve body return spring in accordance with this embodiment.

The valve body return spring 8 is a plate spring supported by a spring guide member 10 housed in the concave part 52 of the body 5, and comprises an outer ring part 81 arranged in contact with the spring guide member 10, an inner ring part 82 arranged in contact with the valve body member 6 and a plurality of spring element parts 83 that connect the outer ring part 81 and the inner ring part 82, as shown in FIG. 3. These multiple spring element parts 83 are arranged at even intervals in a circumferential direction. In order to make a length of the spring element part 83 as long as possible, each of the multiple spring element parts 83 is of a curved shape in a radial direction so as to locate an outer ring side connecting part of each spring element part 83 at a different position in the circumferential direction where an inner ring side connecting part of each spring element part 83 is located. The valve body return spring 8 may use an elastic body other than the plate spring as far as it biases the valve body member 6. The elastic body may bias the valve body member 6 directly or indirectly.

The spring guide member 10 is generally of a shape of a body of rotation whose cross-section is concave in order to support the valve body return spring 8 inside of the concave part 52. On a bottom surface of the spring guide member 10 formed is an opening part 10x that is in communication with the upstream side flow channel 51(A) that opens on a bottom surface of the concave part 52 and an upper end part of a side peripheral wall of the spring guide member 10 makes contact with a peripheral edge part of the valve seat member 4. The valve body return spring 8 is arranged on an inside peripheral surface of the spring guide member 10. In this embodiment, the valve body member 6 is housed in a space formed by the valve seat member 4 and the spring guide member 10. In addition, the valve body member 6 is arranged at a position separated by a determined distance from the inside peripheral surface of the spring guide member 10 and the outside peripheral surface of the valve body member 6 is separated from the inside peripheral surface of the spring guide member 10 facing the outside peripheral surface of the valve body member 6.

Furthermore, the fluid control valve 3 of this embodiment comprises a tilt restraining spring 9 that biases the valve body member 6 in a direction of resolving, i.e., counteracting or eliminating, a tilt of the valve body member 6. The biasing force is equal and opposite of the tilt direction, and the effect of the biasing force is to bias the valve body member 6 to be aligned with and normal to the open/close direction, so as to restrain the tilt of the valve body member 6.

Figure 4:
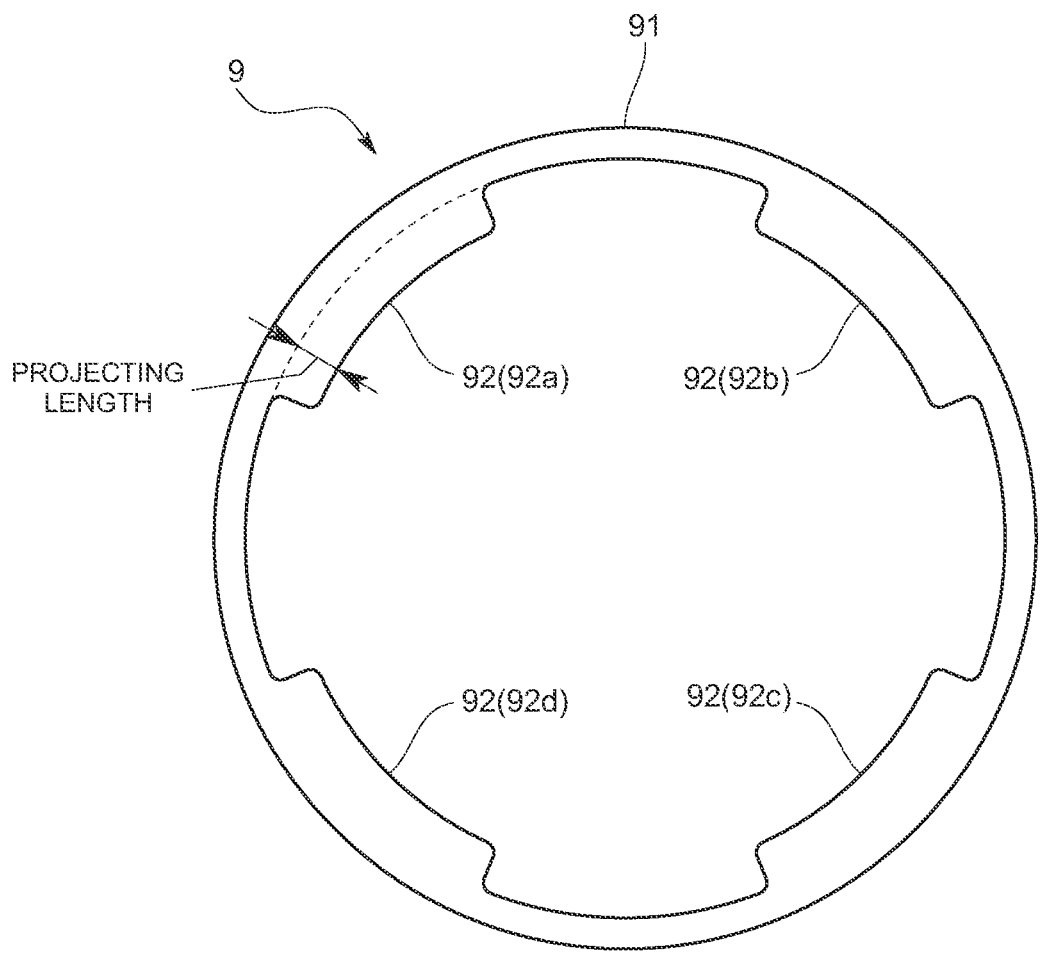
FIG. 4 is a plane view of a tilt restraining spring in accordance with this embodiment.

The tilt restraining spring 9 is a plate spring supported by the spring guide member 10, and comprises, as shown in FIG. 4, an annular plate shaped body part 91 that is arranged making contact with the spring guide member 10 and a plurality of (four, in this embodiment) projecting parts 92 that extend from an inner surface of the body part 91 inward in a radial direction and that elastically transform by making contact with an outer circumferential part of the valve body member 6. Each of the multiple projecting parts 92 has the same shape, and is formed at equal intervals in a circumferential direction. In addition, each of the projecting parts 92 has the same projecting length (length in radial direction) in the circumferential direction.

The tilt restraining spring 9 biases the valve body member 6 in a direction of closing the valve in case that the valve body member 6 moves from a closed state to an open state. In other words, the valve body member 6 is biased by both the valve body return spring 8 and the tilt restraining spring 9 in a direction of closing the valve in case that the valve body member 6 moves from the closed state to the open state. The tilt restraining spring 9 may use an elastic body other than the plate spring as far as it biases the valve body member 6. The elastic body may bias the valve body member 6 directly or indirectly.

As shown in FIG. 2, it is so arranged that the valve body return spring 8 applies a biasing force on a bottom surface in a center side near a center axis of the valve body member 6 and the tilt restraining spring 9 applies a biasing force on a bottom surface in an outside peripheral side of the center side where the biasing force of the valve body return spring 8 is applied. In other words, a position where the inner ring part 82 of the valve body return spring 8 makes contact is located in an internal diameter side of the valve body member 6, and a position where the projecting part 92 of the tilt restraining spring 9 makes contact is located in an external diameter side of the valve body member 6. More specifically, the valve body return spring 8 makes contact with a small diameter step 62 formed on a bottom surface side of the valve body member 6, and the tilt restraining spring 9 makes contact with a large diameter step 63 formed above the small diameter step 62 on an upper surface side of the valve body member 6. And the valve body return spring 8 and the tilt restraining spring 9 are arranged concentrically and fixed to the spring guide member 10 so as to locate the valve body return spring 8 in the downside and the tilt restraining spring 9 in the upside. As mentioned, since it is possible to arrange the valve body return spring 8 and the tilt restraining spring 9 just by mounting the valve body return spring 8 and tilt restraining spring 9 on the spring guide member 10 and by housing the spring guide member 10 in the concave part 52 of the body 5, an assembling procedure can be facilitated. The valve body return spring 8 and the tilt restraining spring 9 may be mounted on the valve body member 6 and the valve body member 6 on which these springs 8, 9 are mounted may be housed in the concave part 52.

In a case where the valve body member 6 tilts relative to the open/close direction, since a projecting part 92 (for example, 92a in FIG. 4) located in a tilt direction largely transforms much more than the other projecting parts 92 (for example, 92b-92d in FIG. 4), an elastic restoring force of the projecting part (92a) becomes larger than an elastic restoring force of the other projecting parts (92b-92d). As a result of this, a biasing force (torque in a direction opposite to the tilt direction) acts on the valve body member 6 as a whole to resolve the tilted state of the valve body member 6 so that the tilted state of the valve body member 6 can be resolved.

In addition, a plate thickness of the tilt restraining spring 9 is set to be thinner than a plate thickness of the valve body return spring 8. Since the tilt restraining spring 9 is intended to resolve the tilted state of the valve body member 6, it is necessary to apply the biasing force to a portion (a peripheral edge part) separated from the center axis of the valve body member 6 as much as possible. Then, a length in a radial direction of the projecting part 92 is required to be short, which requires the projecting part 92 be thin in order to facilitate an elastic transformation. Meanwhile, since the valve body return spring 8 is intended to return the valve body member 6 in a direction of closing the valve, it is necessary to increase a thickness of the valve body return spring 8 in order both to increase mechanical strength and to bias the valve body member 6 in the direction of closing the valve securely. In addition, even though the plate thickness of the valve body return spring 8 is increased, a portion where the valve body member 6 is biased is not especially limited. As a result of this, it is possible to increase the length of the spring element part 83 and to set the elastic transformation to a predetermined degree. This arrangement will not hinder the movement of the valve body member 6 driven by the actuator 7. Since it is necessary for the valve body return spring 8 to increase the length of the spring element part 83 in order to increase both mechanical strength and spring constant, the inner ring part 82 is required to be arranged at a portion near the center of the valve body member 6.

In accordance with the mass flow controller 100 of this embodiment having the above arrangement, since the valve body member 6 is biased in the direction to resolve the tilted state of the valve body member 6, it is possible to restrain the valve body member 6 from tilting. As a result of this, it is possible to prevent the valve body member 6 from tilting and vibrating due to an influence of the pressure received from the fluid. With this arrangement, since the posture of the valve body member 6 while making a movement of closing/opening the valve can be kept constant, it becomes possible to adjust a valve open degree with high accuracy by the actuator 7. As a result of this, a flow rate of the fluid can be controlled with high accuracy. In addition, since the vibration of the valve body member 6 can be prevented, it becomes possible to prevent a vibration sound because the valve body member 6 makes contact with the peripheral devices and to prevent abrasion or breakage of the valve body member 6 or the peripheral devices because the valve body member 6 makes contact with the peripheral devices. Furthermore, since the valve body return spring 8 and tilt restraining spring 9 are arranged separately, it is possible to set the spring constant of the valve body member return spring 8 and the spring constant of the tilt restraining spring 9 individually so as to produce a function of each spring 8, 9 sufficiently. In addition, since the valve body return spring 8 and the tilt restraining spring 9 are used, a natural frequency can be increased, which makes it possible to prevent resonance of the valve body member 6. Furthermore, since the valve body member 6 is arranged separately from the inner surface forming the valve chest through a predetermined space, there is no danger of contamination of the fluid due to abrasion powder or lubricant generated by sliding movements of the valve body member 6 and the valve chest.

In addition, since a plurality of the openings of the internal flow channels 41 are formed on the valve seat surface 4a and a plurality of the openings of the internal flow channels 61 are formed on the seating surface 6a, a pressure of the fluid applied to the valve seat surface 4a or the seating surface 6a becomes uneven due to a difference among the fluid flow rate flowing into each opening or a difference among the fluid flow rate flowing out from each opening. With this arrangement, it is conceivable that the tilt or the vibration of the valve body member 6 is excited, however, since the tilt restraining spring 9 is arranged, it is possible to preferably resolve this situation.

Second Embodiment

The fluid control valve 3 in accordance with a second embodiment is of a normal open type, and unlike the first embodiment, an arrangement of the valve seat member 4 and the valve body member 6 is reversed. The same parts as those in the first embodiment are denoted by the same reference numerals as those in this embodiment.

Figure 5:
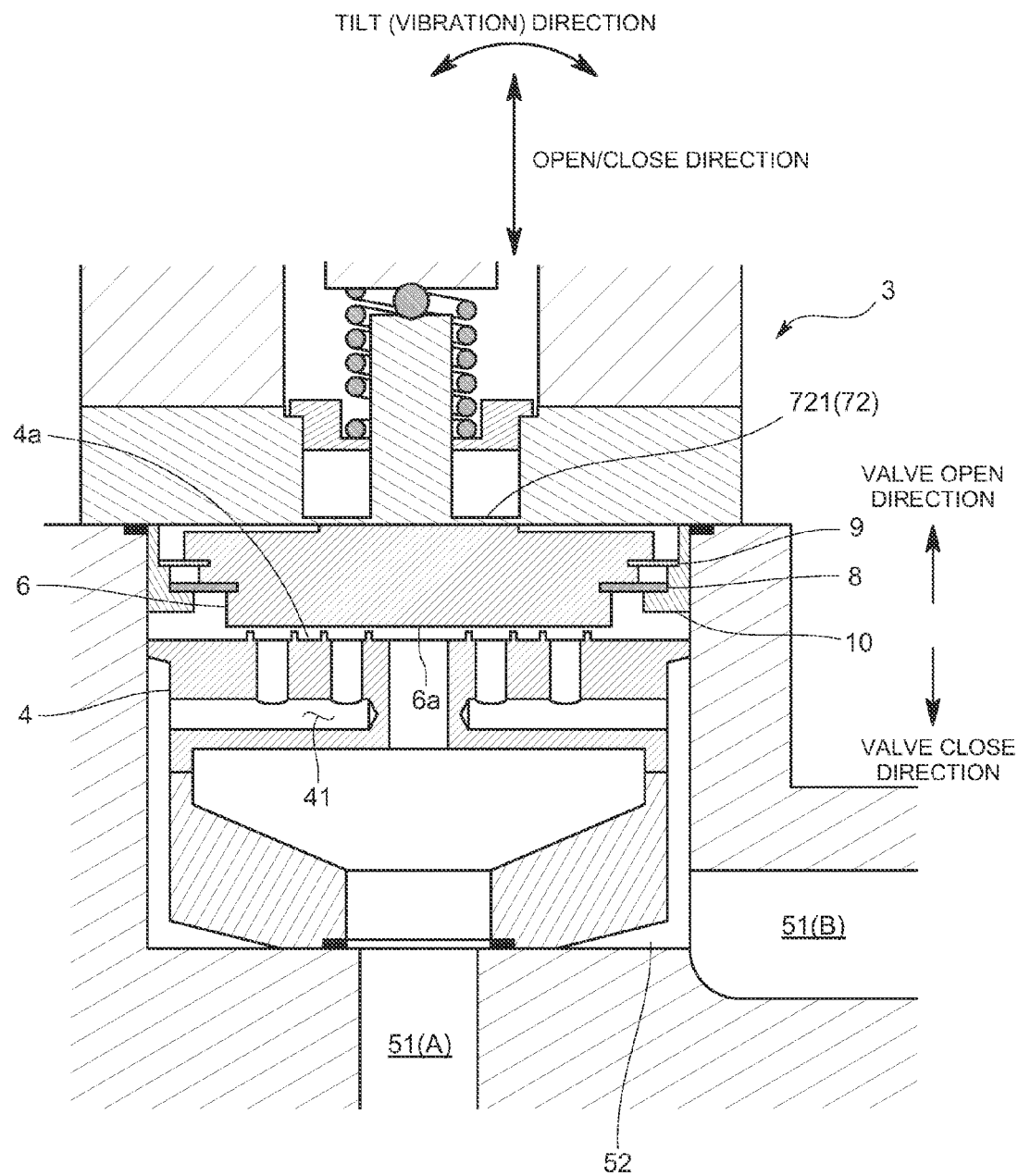
FIG. 5 is a cross-sectional view of a fluid control valve in accordance with a second embodiment of this invention.

In other words, as shown in FIG. 5, the valve body member 6 that moves by means of the actuator 7 is arranged in the actuator 7 side, and the valve seat member 4 is arranged in an opposite side of the actuator 7 to the valve body member 6, namely, in a body 5 side. The valve seat member 4 and the valve body member 6 are arranged to fit into the concave part 52 arranged on the body 5. Similar to the first embodiment, the concave part 52 is arranged to separate the flow channel 51 of the body 5.

In a normal state wherein no voltage is applied to the actuator 7, the valve body member 6 is biased by an elastic body (a plate spring, in this embodiment) arranged to surround the valve body member 6 so that the valve body member 6 is in an open state of being separated from the valve seat member 4. When a voltage is applied to the actuator 7 so as to elongate the actuator 7, the valve body member 6 moves in a direction of closing the valve so that the valve body member 6 is tightly attached to the valve seat member 4 so as to be in a closed state.

In accordance with the fluid control valve 3 of this embodiment having the above arrangement, in addition to the effect of the above-mentioned embodiment, it is possible to downsize the diaphragm member 721 as being the operating member 72 of the actuator 7 and to transfer displacement of the diaphragm member 721 to the valve body member 6 as well. With this arrangement, it is possible to solve the problem of a conventional normal open type flow rate control valve that uses the diaphragm member 721 as the valve body member and to increase a diameter of the valve seat member 4, which enables an increasing flow rate.

Figure 6:
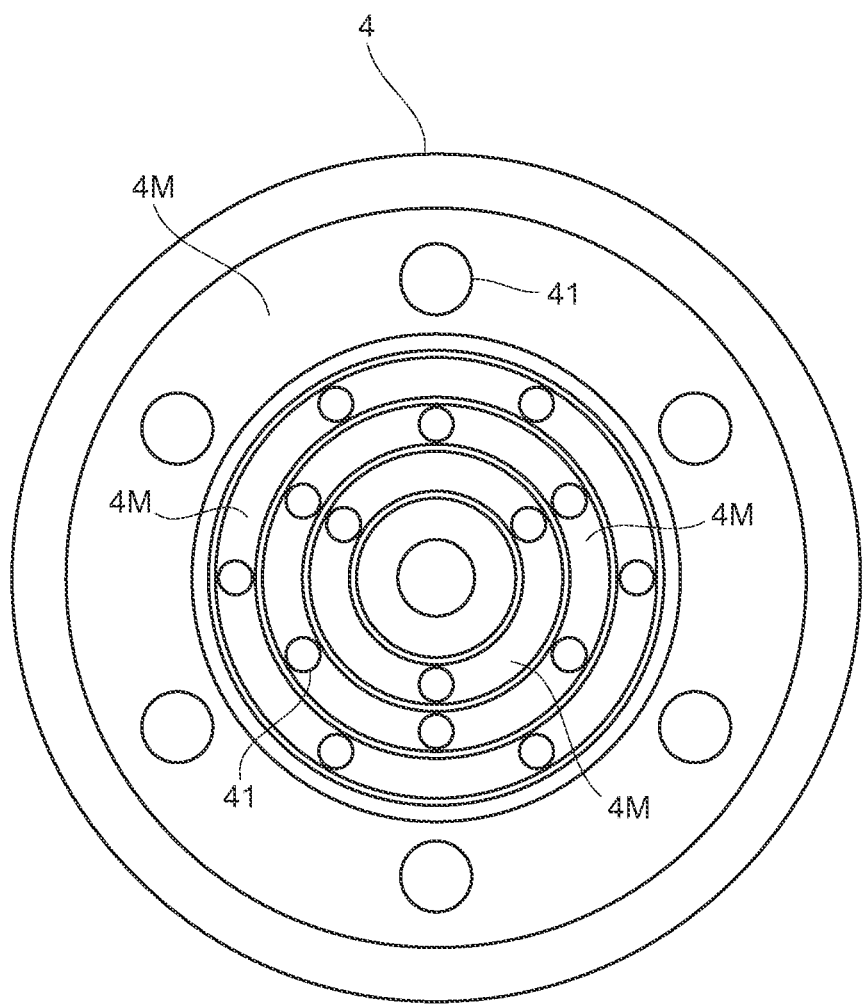
FIG. 6 is a plane view of a valve seat member viewed from a seating surface.

In addition, multiple (four, in FIG. 6) layered concentric circular grooves 4M each of which has a bottom are formed, as shown in FIG. 6, on the valve seat surface 4a of the valve seat member 4 in accordance with the first and second embodiment. An upper surface of a projection that divides the grooves 4M makes contact with the valve body member 6. And an opening of the internal flow channel 41 is formed on the bottom surface of the grooves 4M.

Since the upper surface of the projection formed on the valve seat surface 4a makes contact with the seating surface 6a, an area where the valve seat surface 4a contacts the seating surface 6a can be decreased so that it is possible to improve a characteristic of closing the valve even though a suppress strength of the actuator 7 is small. In addition, it is possible to reduce a pressure loss because the contact area is small.

As mentioned, since the opening of the internal flow channel is formed for every concentric groove 4M, this can be conceived substantially identical to that the fluid flows from an opening whose diameter is the same as the outer diameter of the groove 4M. As a result of this, it is possible both to reduce the pressure loss and to flow a large amount of the fluid. Multiple layered concentric circular grooves each of which has a bottom may also be formed on the seating surface 6a.

The present claimed invention is not limited to the above-mentioned embodiment. For example, in each of the above-mentioned embodiments, this invention is applied to the flow rate control valve, however, it may be applied also to an ON/OFF open/close valve. In addition, the actuator is not limited to piezoelectric type, and may use a magnet coil or the like. Furthermore, this invention is not limited to the mass flow controller into which a fluid control valve is incorporated, and may comprise a fluid control valve alone. In addition, the fluid control valve may be a pressure control valve that controls a pressure of a fluid.

In addition, similar to the valve body return spring, the tilt restraining spring in the above-mentioned embodiment applies the biasing force in the opposite direction (a direction to open the valve or a direction to close the valve) of the driving force of the actuator applied to the valve body member. However, the biasing force may be applied from a direction orthogonal in a direction of opening or closing of the valve by making contact with the side peripheral surface of the valve body member. In this case, it is preferable that the tilt restraining spring is arranged at two positions vertically in the axial direction.

Furthermore, the tilt restraining spring in the above-mentioned embodiment is so arranged that the body part makes contact with the valve chest side (concretely, the spring guide member) and the projecting part makes contact with the valve body member, however, the arrangement of the body part and the projecting part may be reversed. In addition, multiple tilt restraining springs may be arranged in the circumferential direction. Furthermore, the valve body return spring or the tilt restraining spring may be arranged in a state of making contact with the concave part formed on the body without using the spring guide member.

In addition, if we focus on a point that the tilt of the valve body member relative to the open/close direction is resolved, the arrangement may not have a valve body return spring. In this case, it is preferable that the tilt restraining spring applies its biasing force on the outer circumferential part of a part having the maximum outer diameter of the valve body member or its vicinity. In accordance with this arrangement, since a moment that acts on the valve body member can be increased as much as possible, it is possible to preferably resolve the tilt of the valve body member relative to the open/close direction.

In addition, a part or all of the above-mentioned embodiment or the modified embodiment may be appropriately combined, and it is a matter of course that the present claimed invention is not limited to the above-mentioned embodiments and may be variously modified without departing from the spirit of the invention.

EXPLANATION OF REFERENCE CHARACTERS

3 . . . fluid control valve
4 . . . valve seat member
5 . . . body
51(A) . . . upstream side flow channel
51(B) . . . downstream side flow channel
6 . . . valve body member
7 . . . actuator
8 . . . valve body return spring
9 . . . tilt restraining spring
91 . . . body part
92 . . . projecting part

The invention claimed is:
1. A fluid control valve that is configured to control a fluid from an upstream side flow channel and is configured to flow out the fluid to a downstream side flow channel, comprising
a valve body that is arranged within a valve chest, and that moves through a predetermined space in the valve chest without making contact with a fixed support member that has a surrounding surface that surrounds a side surface of the valve body, and that is arranged on a valve seat arranged in the valve chest in a detachable manner, an actuator that is configured to bias the valve body in a direction of opening or closing the valve, a valve body return spring that is configured to bias the valve body in a direction of closing or opening the valve and that is arranged in contact with the fixed support member and is arranged in contact with the valve body, and a tilt restraining spring that is configured to bias the valve body in a direction of resolving a tilt of the valve body to the direction of opening or closing the valve and that is arranged in contact with the fixed support member and is arranged in contact with the valve body.

2. The fluid control valve described in claim 1, wherein the tilt restraining spring has a ring-shaped body part, and a plurality of projecting parts that extend from the ring-shaped body part.

3. The fluid control valve described in claim 2, wherein each of the plurality of projecting parts is of the same shape and formed at even intervals in a circumferential direction.

4. The fluid control valve described in claim 1, wherein the valve body return spring is configured to apply a biasing force on a center side near a center axis of the valve body, and the tilt restraining spring is configured to apply a biasing force on an outside peripheral side of the center side of the valve body where the biasing force of the valve body return spring is applied.

5. A fluid control valve that is configured to control a fluid from an upstream side flow channel and is configured to flow out the fluid to a downstream side flow channel, comprising a valve body that is arranged within a valve chest, and that moves through a predetermined space in the valve chest without making contact with a fixed support member that has a surrounding surface that surrounds a side surface of the valve body, and that is arranged on a valve seat arranged in the valve chest in a detachable manner, an actuator that biases the valve body in a direction of closing the valve, a valve body return spring that biases the valve body in a direction of opening the valve and that is arranged in contact with the fixed support member and is arranged in contact with the valve body, and a tilt restraining spring that biases the valve body in a direction of resolving a tilt of the valve body to the direction of opening or closing the valve, and that is arranged in contact with the fixed support member and is arranged in contact with the valve body.

6. The fluid control valve described in claim 5, wherein the tilt restraining spring has a ring-shaped body part, and a plurality of projecting parts that extend from the ring-shaped body part.

7. The fluid control valve described in claim 6, wherein each of the plurality of projecting parts is of the same shape and formed at even intervals in a circumferential direction.

8. The fluid control valve described in claim 5, wherein the valve body return spring is configured to apply a biasing force on a center side near a center axis of the valve body, and the tilt restraining spring is configured to apply a biasing force on an outside peripheral side of the center side of the valve body where the biasing force of the valve body return spring is applied.

9. The fluid control valve described in claim 2, wherein the ring-shaped body part is arranged to make contact with a surface that is located in an interior of the valve chest, and the plurality of projecting parts are arranged to make contact with the valve body side.

* * * * *